US012763705B2

(12) United States Patent
El Halabi Fares et al.

(10) Patent No.: US 12,763,705 B2
(45) Date of Patent: Oct. 13, 2026

(54) HYBRID MULTI-STAGE DEVICE FOR MOTOR STARTERS

(71) Applicant: Saudi Arabian Oil Company, Dhahran (SA)

(72) Inventors: Nabil El Halabi Fares, Dhahran (SA); Ricardo Jose Guerra Castillo, Madrid (ES); Abdulaziz Yahya Hannani, Jizan (SA); Omar Mohammad Bamasq, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 250 days.

(21) Appl. No.: 18/629,405

(22) Filed: Apr. 8, 2024

(65) Prior Publication Data

US 2025/0317078 A1 Oct. 9, 2025

(51) Int. Cl.

| | |
|---|---|
| ***H02H 7/08*** | (2006.01) |
| ***H02P 1/02*** | (2006.01) |
| ***H02P 1/46*** | (2006.01) |
| ***H02P 23/14*** | (2006.01) |

(52) U.S. Cl.

CPC .............. *H02P 1/021* (2013.01); *H02P 1/027* (2013.01); *H02P 1/46* (2013.01); *H02P 23/14* (2013.01)

(58) Field of Classification Search

CPC ... H02P 6/20; H02P 1/021; H02P 1/46; G05B 15/02

See application file for complete search history.

(56) References Cited

U.S. PATENT DOCUMENTS

| | | | | |
|---|---|---|---|---|
| 7,038,423 | B2 | 5/2006 | Reed et al. | |
| 10,812,007 | B1 * | 10/2020 | Fraser | H02P 29/028 |

FOREIGN PATENT DOCUMENTS

| | | | |
|---|---|---|---|
| CN | 101888093 | | 11/2010 |
| CN | 101569086 | | 9/2012 |
| CN | 202444403 U | * | 9/2012 |

* cited by examiner

*Primary Examiner* — Karen Masih

(74) *Attorney, Agent, or Firm* — Dinsmore & Shohl LLP

(57) ABSTRACT

Systems, methods, and apparatuses include an alternating current (AC) contactor comprising a contactor coil, the AC contactor configured to selectively connect a power source to a motor, a controller power transformer (CPT) electrically connected to the contactor coil by a CPT switch, a resistor-inductor-capacitor (RLC) circuit electrically connected to the contactor coil by an RLC circuit switch, a voltage monitor electrically connected to the contactor coil to sense voltage across the contactor coil, and a switch controller to active the RLC circuit switch to selectively connect the RLC circuit to the contactor coil during a low-voltage event determined by the switch controller from voltage across the contactor coil sensed by the voltage monitor. The RLC circuit can discharge stored electrical energy to power the contactor. A second RLC circuit can be included in the apparatus and controllably discharged to extend the low-voltage ride-through.

17 Claims, 7 Drawing Sheets

HYBRID MULTI-STAGE DEVICE FOR MOTOR STARTERS

TECHNICAL FIELD

This disclosure pertains to a hybrid multi-stage device for powering motor starters during a low voltage event.

BACKGROUND

Industry processes can be exposed to shutdowns due to momentary low voltage events (also referred to as voltage sags or voltage dips) that cause low voltage (LV) motor contactor to disconnect the motor from its power source. On yearly basis, several major process shutdown investigation reports highlight this issue as root cause and draw significant production loss as compared with the fault originator cost of a simple contactor dropout.

Reportedly, in certain oil and gas plants between 2016-2018 process interruption due to tolerable voltage dips accounted for more than 2.5 millions of barrels per day (MMBD) of crude oil production curtailment and 400 million standard cubic feet per day (MMSCFD) of gas production flaring.

SUMMARY

The present disclosure describes a device and technique that can be used for preventing motor power disconnect caused by tolerable voltage dip events. The device with its techniques include charging one or more resistor-inductor-capacitor (RLC) circuit stages using control power transformer (CPT) and connecting the RLC circuit to the contactor coil during a low-voltage event to discharge the RLC circuit to charge the coil.

In some implementations, a computer-implemented method includes the following.

Aspects of the implementations are directed to an apparatus including a resistor-inductor-capacitor (RLC) circuit electrically connected to a contactor coil by an RLC circuit switch; a voltage monitor electrically connected to the contactor coil to sense voltage across the contactor coil; and a switch controller to active the RLC circuit switch to selectively connect the RLC circuit to the contactor coil during a low-voltage event determined by the switch controller from voltage across the contactor coil sensed by the voltage monitor.

In some implementations, the RLC circuit is a first RLC circuit and the RLC circuit switch is a first RLC circuit switch, the apparatus further including a second RLC circuit electrically connected to the contactor coil by a second RLC circuit switch; and wherein the switch controller is configured to activate the second RLC circuit switch to selectively connect the contactor coil to the second RLC circuit based on a determination of a low-voltage event determined from voltage sensed by the voltage monitor.

In some implementations, the switch controller determines the presence of a low-voltage event based on the voltage sensed by the voltage monitor falling below a voltage threshold.

In some implementations, the RLC circuit is configured to be an under-damped RLC circuit.

In some implementations, the RLC circuit is configured to discharge electrical energy for a predetermined amount of time.

In some implementations, the RLC circuit switch includes an insulated-gate bipolar transistor.

In some implementations, the switch controller is configured to disconnect the CPT from the contactor coil by controlling the CPT switch to turn off based on the determination of the low-voltage event and to connect the CPT to the contactor coil by controlling the CPT switch to turn on based on a determination that the low-voltage event is over.

In some implementations, the CPT is configured to charge the RLC circuit.

Aspects of the implementations are directed to a method including actuating a contactor coil to connect a power source to a motor; detecting voltage across the contactor coil; determining a presence of a low-voltage event; and connecting a resistor-inductor-capacitor (RLC) circuit to the contactor coil based on the determination of the presence of the low-voltage event; wherein connecting the RLC circuit to the contactor coil causes the RLC circuit to discharge stored electrical energy in the RLC circuit to the contactor coil.

In some implementations, connecting the RLC circuit includes activating an RLC circuit switch.

In some implementations, the RLC circuit is a first RLC circuit, the method further including after connecting the first RLC circuit to the contactor coil, determining that the low-voltage event is persisting; and connecting a second RLC circuit to the contactor coil to discharge electrical energy stored in the second RLC circuit to the contactor coil.

In some implementations, connecting the second RLC circuit includes activating a second RLC circuit switch.

In some implementations, determining the presence of a low voltage event includes comparing voltage measured across the contactor coil with a threshold voltage, and determining that the voltage measured across the contactor coil is below the threshold voltage.

Aspects of the implementations are directed to a system including a motor including a rotor including three rotor coils; a three-phase power supply; an alternating current (AC) contactor including a contactor coil, the AC contactor configured to selectively connect the three-phase power source to each of the three rotor coils of the motor; a control power transformer (CPT) electrically connected to the contactor coil by a CPT switch; a resistor-inductor-capacitor (RLC) circuit electrically connected to the contactor coil by an RLC circuit switch; a voltage monitor electrically connected to the contactor coil to sense voltage across the contactor coil; and a switch controller to active the RLC circuit switch to selectively connect the RLC circuit to the contactor coil during a low-voltage event determined by the switch controller from voltage across the contactor coil sensed by the voltage monitor.

In some implementations, the RLC circuit is a first RLC circuit and the RLC circuit switch is a first RLC circuit switch, the apparatus further including a second RLC circuit electrically connected to the contactor coil by a second RLC circuit switch; and wherein the switch controller is configured to activate the second RLC circuit switch to selectively connect the contactor coil to the second RLC circuit based on a determination of a low-voltage event determined from voltage sensed by the voltage monitor.

In some implementations, the switch controller determines the presence of a low-voltage event based on the voltage sensed by the voltage monitor falling below a voltage threshold.

In some implementations, the RLC circuit is configured to be an under-damped RLC circuit.

In some implementations, the RLC circuit is configured to discharge electrical energy for a predetermined amount of time.

In some implementations, the RLC circuit switch includes an insulated-gate bipolar transistor.

In some implementations, the switch controller is configured to disconnect the CPT from the contactor coil by controlling the CPT switch to turn off based on the determination of the low-voltage event and to connect the CPT to the contactor coil by controlling the CPT switch to turn on based on a determination that the low-voltage event is over.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. For example, techniques described herein enables low-voltage ride-through capabilities for the motors during tolerable short-duration low-voltage dips events. These techniques can also be applicable to any low voltage sensitive loads that requires short-time ride-through capabilities without the need of investing in additional batteries or expensive uninterruptible power supply.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

BRIEF DESCRIPTION OF THE DRAWINGS

Like reference numbers and designations in the various drawings indicate like elements.

DETAILED DESCRIPTION

The following detailed description describes techniques preventing motor power disconnect caused by tolerable low voltage events. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 4:
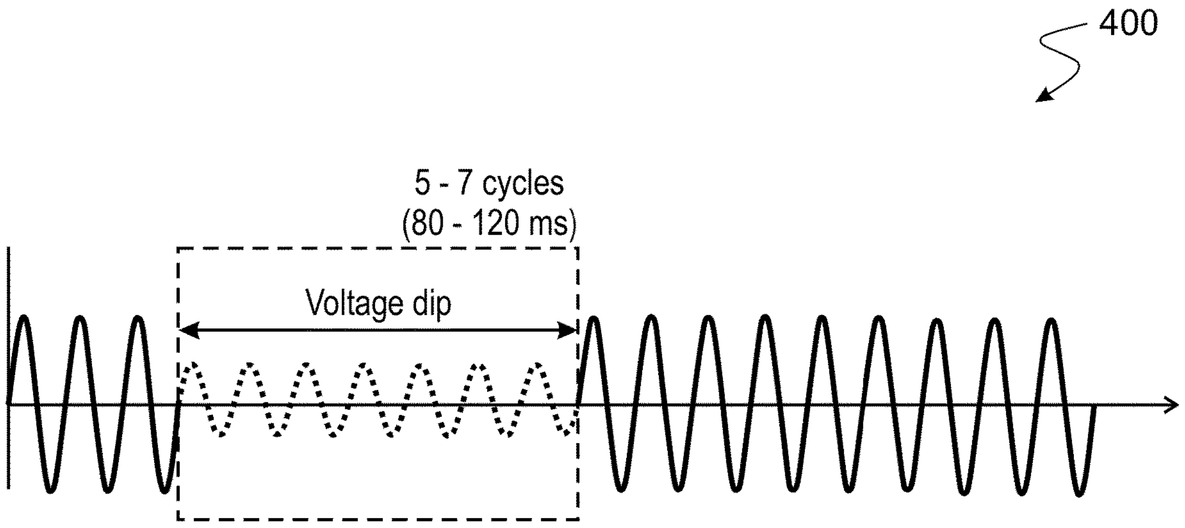
FIG. 4 is a graphical diagram illustrating an example low-voltage event.

International standards and industry practices therefore introduces the requirement of voltage dip ride-through capability on motors that are required to remain connected during tolerable voltage dips. FIG. 4 shows one example grid code requirement for fault clearance time at systems of 115 kV and above. IEEE and IEC standards, and several industry practices have been implementing this concept of ride-through capability through devices that require the conversion of motors contactors from AC coils to DC coils, or to introduce constant voltage transformers, which are invasive and cost-intensive devices. In this disclosure, the techniques described do not require a conversion of the AC coil to a DC coil.

In some implementations, a motor starter system includes a first resistor-inductor-capacitor (RLC) circuit stage for charging a contactor coil during a low-voltage event to maintain operation of a motor. In some implementations, the motor starter system includes a second RLC circuit stage to extend the low-voltage ride-through to continue operation of the motor during a low-voltage event.

Figure 1A:
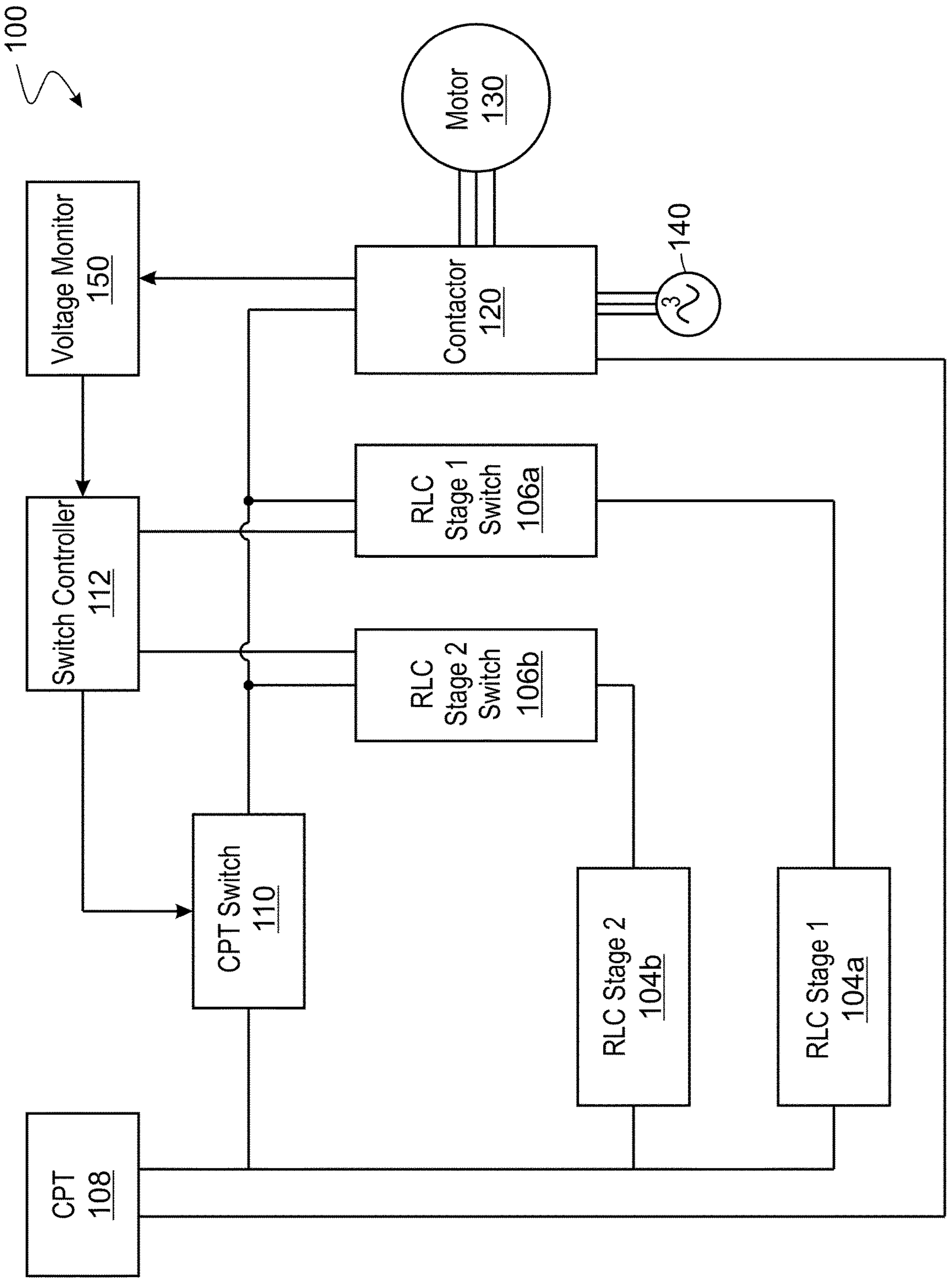
FIGS. 1A-C are schematic diagrams of a motor starter system that includes an example implementation of a contactor and a first resistor-inductor-capacitor (RLC) circuit stage and a second RLC circuit stage in accordance with some implementations of the present disclosure.
Figure 1B:
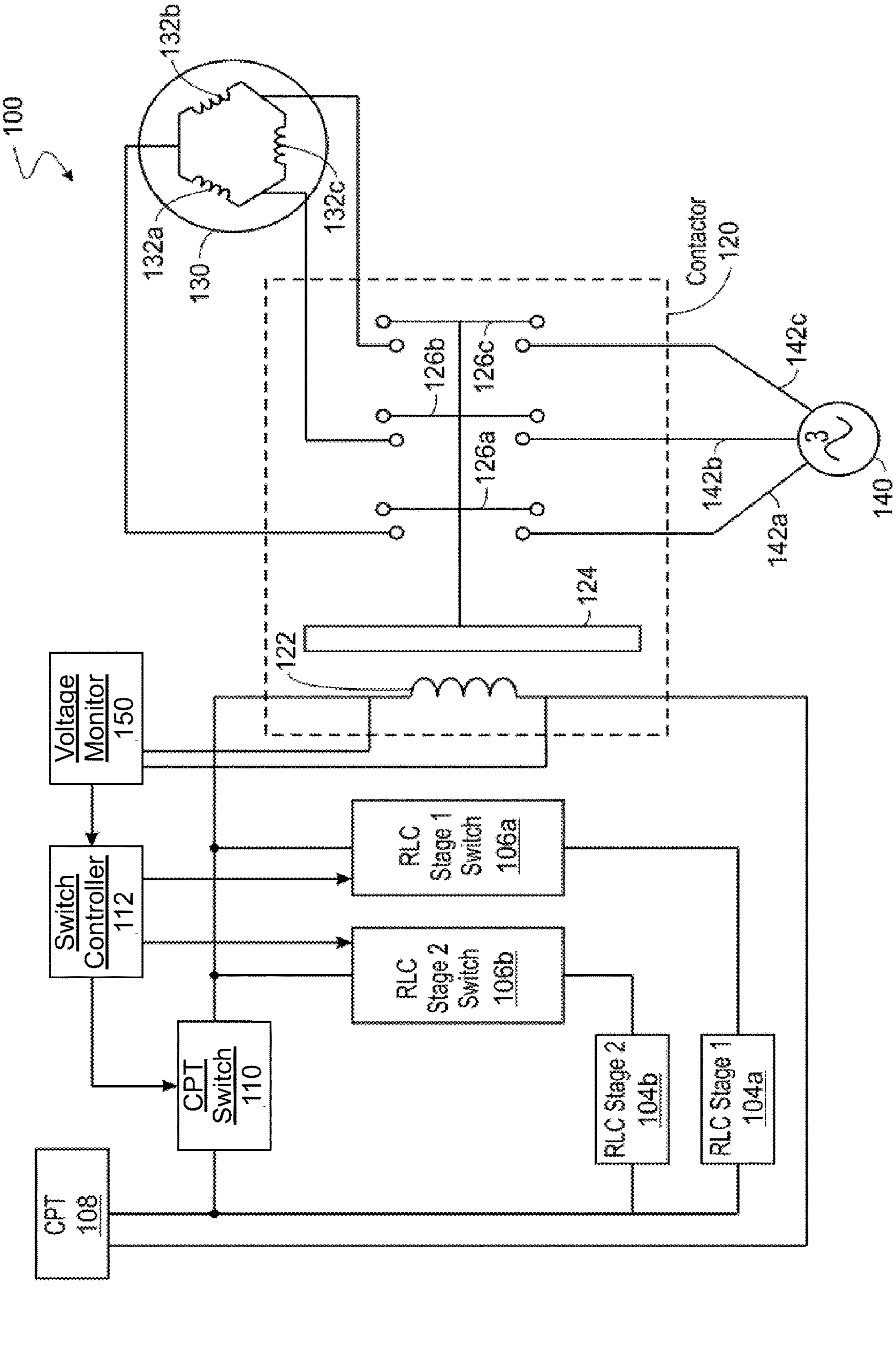
Figure 1C:
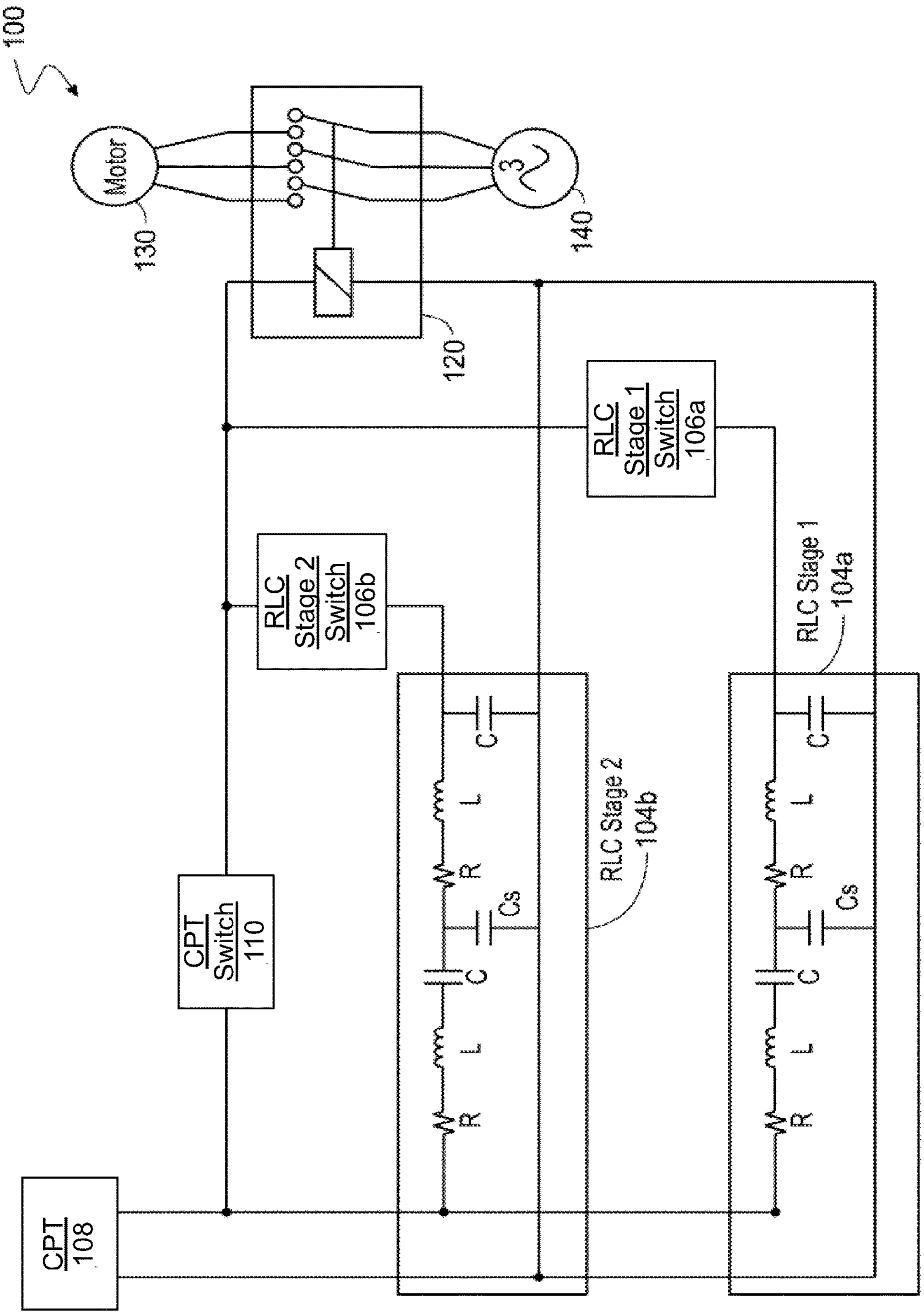

This disclosure describes a device with an internal analogue under-damped RLC circuit with a specific connection set of resistors, inductors, capacitors, switched through transistors to provide AC voltage supply to a motor starter contactor during voltage dips. This power supply is used to avoid motor contactors from dropping out during tolerable voltage dips that will result in costly process shutdown and lengthy start-up to restore production. The motor starter system described herein does not rely on any battery supply or rectifiers/inverters to supply AC power. The motor starter system capitalizes on the performance on under-damped circuit with a resonant frequency equal to the operating frequency such that the change of state once voltage dip occurs will result in an AC output voltage with same frequency and magnitude to the nominal values of the contactor's coil. The subject device is scalable with multiple stages to allow a customized time for ride-through depending on process need. FIGS. 1A-C shows an equivalent diagram of the proposed device an its interconnection to an existing low-voltage (LV) motor starter.

FIGS. 1A-C are schematic diagrams of a motor starter system 100 that includes an example implementation of a contactor and a first resistor-inductor-capacitor (RLC) circuit stage and a second RLC circuit stage in accordance with some implementations of the present disclosure. FIGS. 1A-C each illustrate various implementation details of the motor starter system 100 of the present disclosure. FIGS. 1A-C are described together for ease of explanation.

The motor starter system 100 includes a contactor 120, the details of which are illustrated in more detail in FIG. 1B. In addition, the example motor starter system 100 includes a first RLC circuit stage (RLC stage 1) 104*a* and a second RLC circuit stage (RLC stage 2) 104*b*. In some implementations, a single RLC circuit stage can be used. In some implementations, more than two RLC circuit stages can also be used. The number of RLC circuit stages used can be determined based on the desired duration of the low-voltage ride-through. Likewise, the design of the RLC circuit can also be determined based on the desired amount of power discharged from the RLC stage(s), the desired duration of the low-voltage ride-through, or other factors. One example design of the RLC circuit is shown in FIG. 1C.

Turning first to FIG. 1A, the motor starter system 100 includes a contactor 120 for connecting a motor 130 to a power source 140. In this example, the power source is a three-phase AC power supply, but other power supplies can be used. The motor can be a low-voltage motor driven by the three-phase AC power supply.

The motor starter system 100 also includes a control power transformer (CPT) 108 for supplying power for the contactor coil 122 (shown in FIG. 1B). The CPT 108 is coupled to the contactor coil 108 through a CPT switch 110. The CPT switch 110 can be, for example, an insulated-gate bipolar transistor (IGBT). The IGBT can include a capacitor (e.g., a 10 μF capacitor) in parallel to prevent switch arcing. Other types of switches can also be used. The CPT switch 110 can be controlled to connect or disconnect the CPT 108 from the contactor coil 122. For example, a switch controller 112 can be used to control the CPT switch 110. The switch controller 112 can receive electrical information from the contactor coil from a voltage monitor 150 electrically connected to or across the contactor coil 122. The electrical information can include information indicating the persistence of a low-voltage event occurring at the contactor coil 122. In embodiments, the contactor coil 122 is an AC coil for an AC contactor.

The motor starter system 100 also includes an RLC stage 1 circuit 104*a*. The RLC stage 1 circuit 104*a* is connected to the contactor coil 122 through an RLC stage 1 switch 106*a*. The RLC stage 1 switch 106*a* is controlled through a switch controller 122. In the example shown in FIGS. 1A-C, the motor starter system 100 includes an RLC stage 2 circuit 104*b*. The RLC stage 2 circuit 104*b* is connected to the contactor coil 122 through an RLC stage 2 switch 106*b*. The RLC stage 2 switch 106*b* is controlled through a switch controller 122. Switch controller 122 can be coupled to a voltage monitor 150 that can connect the RLC stage 1 104*a* and RLC stage 2 104*b* to the connector coil 122 based on the voltage across the contactor coil 122. The RLC stage 1 switch 106*a* and the RLC stage 2 switch 106*b* can include an IGBT or other type of switch. A capacitor (e.g., a 10 μF capacitor) can be coupled in parallel to the IGBT of each switch for preventing arcing during switches.

Turning to FIG. 1B, the contactor 120 includes a contactor coil 122. Power supplied from CPT 108 is used to energize the contactor coil 122 to generate a magnetic field to actuate contactor movable magnetic element 124. Upon actuation, the movable magnetic element 124 moves to close the contactor contacts 126*a*, 126*b*, and 126*c*. When actuated, contact 126*a* connects a first phase 142*a* of three phase power supply 140 to a first input lead 132*a* of motor 130. When actuated, contact 126*b* connects a second phase 142*b* of three phase power supply 140 to a second input lead 132*b* of motor 130. When actuated, contact 126*c* connects a third phase 142*c* of three phase power supply 140 to a third input lead 132*c* of motor 130. The motor includes three rotor coils, and the power from the power supply causes a current to flow through the rotor coils to generate a magnetic field for powering the motor.

When a low-voltage event (e.g., a voltage dip or voltage sag) occurs, the voltage across the contactor coil 122 can drop to a level insufficient to maintain actuation of the contactor, which can cause the contactor contacts to disengage, thereby shutting off power to the motor 130. The motor starter system 100, therefore, includes one or more RLC circuits for keeping the contactor coil 122 charged during a low-voltage event (each RLC circuit is referred to as an RLC stage, and each RLC stage can be switched independently to discharge stored electrical energy through the contactor coil 122 during a low-voltage event).

During operation, the CPT 108 also charges the RLC stage 1 104*a* and RLC stage 2 104*b* circuits. Each of the RLC circuits are designed to store power sufficient to charge the contactor coil 122 when connected. In addition, each of the RLC circuits are designed to discharge sufficient power to charge the contactor coil 122 for a desired amount of time. The number of RLC stages can be selected based on a total amount of time for low-voltage ride-through.

As shown in FIG. 1B, the RLC stage 1 104*a* is connected to the contactor coil 122 through RLC stage 1 switch 106*a* by the switch controller 112 based on voltage across the contactor coil 122 falling below a threshold value, as determined from voltage detected by voltage monitor 150. The RLC stage 1 switch 106*a* is controlled by a switch controller 112. The voltage monitor 150 can detect the voltage, which it supplies to a switch controller 112. The switch controller 112 can activate RLC stage 1 switch 106*a* when the switch controller 112 determines that the voltage across the contactor coil 122 is below a threshold value. When the RLC stage 1 104*a* is connected to the contactor coil 122, the RLC stage 1 104*a* discharges its stored electrical energy through the connector coil 122. Based on the RLC stage 1 104*a* configuration, the RLC stage 1 104*a* can discharge electrical energy over a predetermined period of time (e.g., 250 ms). If the low-voltage event persists after the expiration of the RLC stage 1 discharge time (as determined by the voltage monitor 150), the switch controller 112 can connect the RLC stage 2 104*b* to the contactor coil 122 by activating the RLC stage 2 switch 106*b*. More RLC stages can be included in the motor starter system 100, which can extend the low-voltage ride-through time.

In the implementation shown in FIGS. 1A-1C, the motor starter system 100 includes two RLC stages. After the second RLC stage discharges completely, and if the low-voltage event persists, the switch controller can disconnect the CPT 108 from the contactor 120 via CPT switch 110, to shut down the motor 130. In some implementations, the switch controller 112 can disengage the CPT 108 from the contactor coil 122 while one of the RLC stages are connected to the contactor coil 122. When the low-voltage event ends, the switch controller 112 can reconnect the CPT 108 to the contactor coil 122 through CPT switch 110 so that power can be delivered to the motor seamlessly. This allows the motor 130 to remain in operation without interruption through the low-voltage event.

In FIG. 1C, the RLC stage 1 104*a* and RLC stage 2 104*b* implementation examples are illustrated. Each RLC stage includes a set of passive components resistors, inductors, and capacitors. The RLC stages 104*a* and 104*b* are designed to be under-damped, with a discharge profile of a decaying sinusoid, shown in more detail in FIG. 3. The connection of these RLC components are arranged such that the system response becomes underdamping, meaning that the output of the RLC circuit will oscillate at frequencies close to the 50 Hz or 60 Hz but with decreasing amplitude as its stored energy is used to keep contactors coil energized. The stored energy is in a shunt connected capacitor internal to the RLC circuit. The shunt can be implemented as a shunt capacitor Cs that is part of the RLC circuit. Each RLC stage is designed to provide sufficient energy for contactors coils to remain energized for a determined time, which can be for example 250 ms, but RLC stage(s) can vary according to each application. Thus, the ride-through capability is achieved through either a single- or multi-stage passive analogue RLC circuits selected to provide an under-damped response for changes in the primary voltage provided by the CPT 108. The duration of the ride-through capability is scalable by stages of 250 ms to meet process need and minimize footprint per application. The multi-stage under-damped RLC circuits are connected to the contactor coil through a set of transistors.

As mentioned already, an upstream CPT switch 110 (which can include a transistor, such as an IGBT) can isolate the AC coil 122 from the CPT 108 once voltage dip is sensed (e.g., by the switch controller 112 and voltage monitor 150). Each RLC stage switch 106*a* and 106*b* (which can include a transistor, such as an IGBT) that will connect the respective circuit to discharge with an under-damped response the stored energy through an AC voltage waveform. Once the low-voltage event is detected, the RLC stage 1 switch 106*a* closes, and discharges for 250 ms (or for whatever discharge time is desired based on the circuit design of the RLC circuit). Once 250 ms is elapsed, and the low-voltage event persists, the RLC stage 2 switch 106*b* closes to extend the low-voltage ride-through capability for another 250 ms. For each stage included in the motor starter system, the low-voltage ride-through can be extended for the desired amount of time.

Regarding the IGBT switches for the RLC stage 1 switch 106*a* and RLC stage 2 switch 106*b*, the switch controller 112 can also scale the power output from the switch using the gate voltage.

Figure 3:
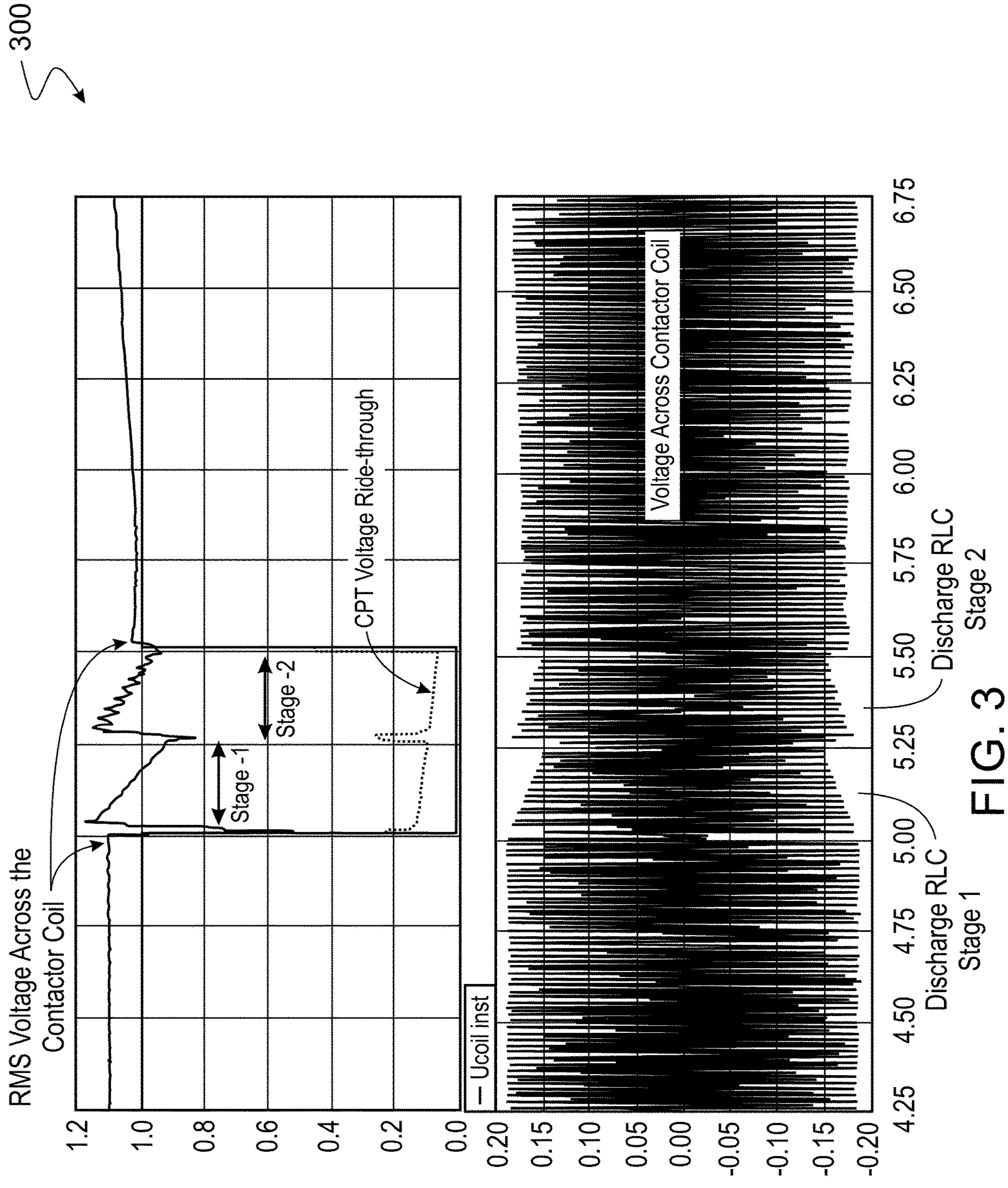
FIG. 3 is a graphical diagram illustrating a voltage across the contactor coil during a low-voltage event in accordance with some implementations of the present disclosure.

FIG. 3 is a graphical diagram 300 illustrating a voltage across the contactor coil during a low-voltage event in accordance with some implementations of the present disclosure. FIG. 3 shows the simulation results implementing the invention of introducing under-damped multi-stages circuits to supply AC voltage for ride-through capability. Note that with voltage dip initiation, CPT voltage drops to 10% of rated voltage, while the output voltage of the proposed circuit remains above the drop-out value of contactors coil, allowing contactor to remain closed and maximizing power continuity to process. The specific example simulation shown in FIG. 3, the RLC includes two (2) stages, each of 250 ms that provides successful AC voltage across contactor's coil throughout the voltage dip duration.

Figure 2:
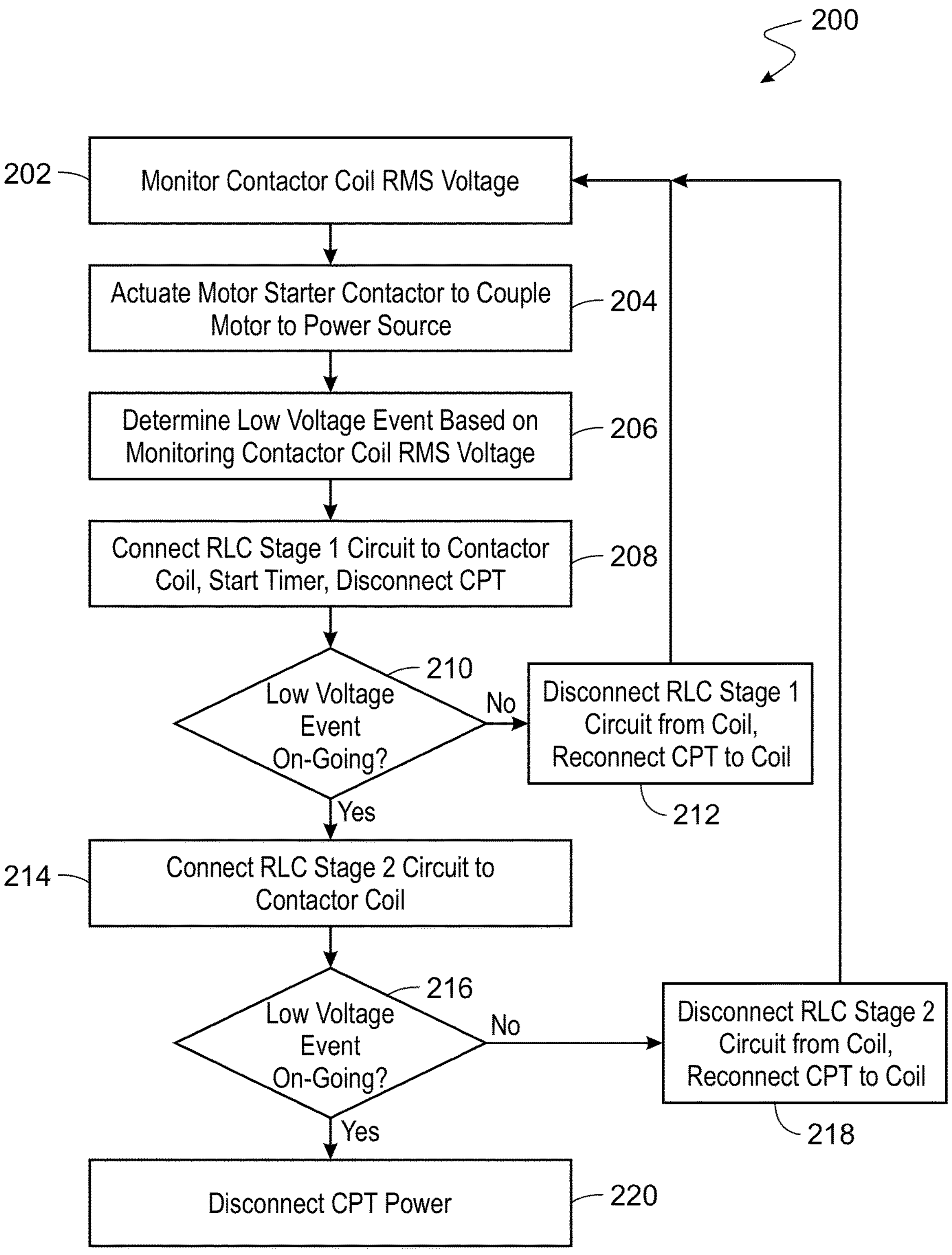
FIG. 2 is a process flow diagram for controlling a motor starter during a low-voltage event in accordance with some implementations of the present disclosure.

FIG. 2 is a flowchart of an example of a method 200 for operating a motor starter system 100, according to some implementations of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order.

At 202, a voltage monitor senses voltage across a contactor coil of an AC contactor. The voltage monitor monitors voltage across the contactor coil for the duration of the motor starter system operation. The voltage monitor provides the sensed voltage to a switch controller that controls a CPT switch that couples the CPT to the contactor coil, an RLC stage 1 switch that connects an RLC stage 1 to the contactor coil, and an RLC stage 2 switch that connects an RLC stage 2 to the contactor coil.

From 202, method 200 proceeds to 204.

At 204, the CPT is turned on and electrically connected to the contactor coil through a CPT switch. By connecting the CPT to the contactor coil, current flows through the contactor coil, which generates a magnetic field. The magnetic field acts on a movable magnetic element physically connected to a set of contacts, which moves in response to the presence of the magnetic field generated by current flowing through the coil. The current flowing through the coil should be of sufficient magnitude, such that the resulting magnetic field is sufficiently strong to keep the movable magnetic element engaged. By doing so, the contactor is "actuated." When actuated, the contactor's contacts close a circuit, electrically connected a power source to a motor. When the current through the coil drops sufficiently (e.g., during a low-voltage event), the resulting magnetic field strength drops. If the magnetic field drops sufficiently, the magnetic field strength cannot maintain the "closed" position of the movable magnetic element. This results in the contacts disengaging from the power source and the motor, disconnecting the power source from the motor. At 204, however, the CPT is not experiencing a low-voltage event yet, and the voltage or current delivered to the coil is sufficient to actuate the contactor to cause power to be supplied to the motor.

When turned on, the CPT also charges the one or more RLC circuits of the motor starter system. The RLC circuits are designed to store electrical energy when not connected to the coil, and can discharge stored electrical energy when connected to the coil.

From 204, method 200 proceeds to 206.

At 206, the system experiences a low-voltage event, such as a voltage dip or voltage sag. The low-voltage event is sensed by a voltage monitor connected in parallel to the contactor coil. The voltage monitor can sense voltage across the coil and provide the voltage measurement to the switch controller. The voltage sensed can be the actual voltage across the coil, or the RMS voltage across the coil. The RMS voltage can also be derived by the voltage monitor or the switch controller. The switch controller (or some other computation element that is part of the motor starter system) can determine that a low-voltage event is occurring based on the sensed voltage. In some embodiments, the low-voltage event is determined by the sensed voltage dropping below a threshold value. In some embodiments, a more sophisticated voltage prediction or current prediction circuit can be used to predict a future value of the voltage or current charging the coil. By predicting a future low-voltage event, the switch controller can switch on the RLC circuits prior to the voltage across the coil dipping below operational levels. In any case, the switch controller can determine the presence of a low-voltage event.

From 206, method 200 proceeds to 208.

At 208, in response to a determination that a low-voltage event is occurring (or will occur), the switch controller can connect the first RLC circuit to the contactor coil. The switch controller can electrically connect the first RLC circuit by activating the first RLC circuit switch. If a transistor is used as an active switch for the first RLC circuit switch, the switch controller can send the appropriate signal to the gate of the transistor to activate the switch. The switch controller can also disconnect the CPT, in some embodiments. The switch controller can disconnect the CPT by deactivating the CPT switch. The first RLC circuit discharges electrical energy to the contactor coil to charge the coil to generate a magnetic field to keep the contactor actuated. The first RLC circuit will discharge its stored electrical energy for a predetermined amount of time, based on the circuit design.

Because the first RLC circuit discharges electrical energy for a certain amount of time, the switch controller can set a timer for determining whether the low-voltage event persists or is over.

From 208, method 200 proceeds to 210.

At 210, the switch controller can determine whether the low-voltage event persists. If the low-voltage event is over, then the switch controller can proceed to 212. At 212, the switch controller can reconnect the CPT to the contactor coil. The switch controller can disconnect the first RLC circuit from the contactor coil. The reconnection of the CPT to the coil and disconnection of the first RLC circuit also causes the first RLC circuit to charge with electrical energy. The process can return to 202.

As mentioned above, the first RLC circuit will discharge for a predetermined amount of time. If the low-voltage event persists past the predetermined amount of time (as sensed by the voltage monitor or predicted by the switch controller or other computational element), the switch controller can proceed to 214. At 214, the switch controller can electrically connect the second RLC circuit to the contactor coil (e.g., by sending an electrical signal to the gate of the transistor of the switch to turn on the switch). The second RLC circuit when connected to the contactor coil discharges electrical energy through the coil to generate a magnetic field with sufficient strength to keep the contactor actuated.

At 216, the switch controller determines whether the low-voltage event is still on-going. If not, then the switch controller can proceed to 218 where the switch controller can disconnect the second RLC circuit and reconnect the CPT to the coil.

If the switch controller determines that the low-voltage event is still on-going, then the switch controller (at 220) shuts down the motor starter system so that the low-voltage event can be addressed.

As mentioned before, a timer can be used by the switch controller to determine when the switch controller should switch on the second RLC circuit. Recall that the RLC circuits discharge electrical energy for a predetermined amount of time. Therefore, the switch controller can use a timer to determine an approximate time for switching to the second RLC circuit. In some embodiments, the switch circuit can use the sensed voltage across the coil to activate the second RLC circuit. For example, as the RMS voltage across the coil from the first RLC circuit decays, the switching circuit can automatically switch to the second RLC circuit to discharge the second RLC circuit's stored electrical energy through the coil.

Figure 5:
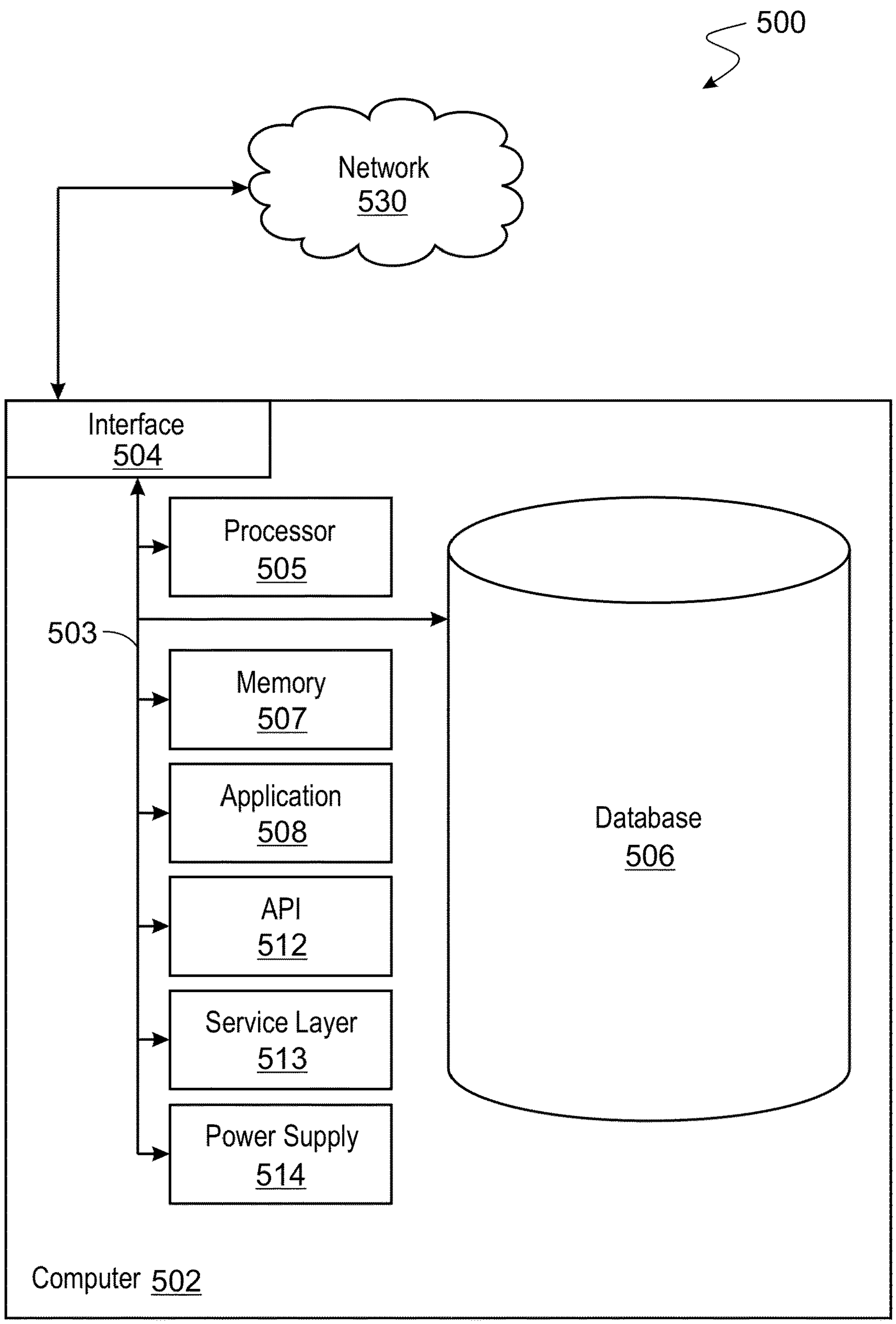
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Examples

Example 1 is an apparatus including a resistor-inductor-capacitor (RLC) circuit electrically connected to a contactor coil by an RLC circuit switch; a voltage monitor electrically connected to the contactor coil to sense voltage across the contactor coil; and a switch controller to active the RLC circuit switch to selectively connect the RLC circuit to the contactor coil during a low-voltage event determined by the switch controller from voltage across the contactor coil sensed by the voltage monitor.

Example 2 may include the subject matter of example 1, wherein the RLC circuit is a first RLC circuit and the RLC circuit switch is a first RLC circuit switch, the apparatus further including a second RLC circuit electrically connected to the contactor coil by a second RLC circuit switch; and wherein the switch controller is configured to activate the second RLC circuit switch to selectively connect the contactor coil to the second RLC circuit based on a determination of a low-voltage event determined from voltage sensed by the voltage monitor.

Example 3 may include the subject matter of any of examples 1-2, wherein the switch controller determines the presence of a low-voltage event based on the voltage sensed by the voltage monitor falling below a voltage threshold.

Example 4 may include the subject matter of any of examples 1-3, wherein the RLC circuit is configured to be an under-damped RLC circuit.

Example 5 may include the subject matter of any of examples 1-4, wherein the RLC circuit is configured to discharge electrical energy for a predetermined amount of time.

Example 6 may include the subject matter of any of examples 1-5, wherein the RLC circuit switch includes an insulated-gate bipolar transistor.

Example 7 may include the subject matter of any of examples 1-6, wherein the switch controller is configured to disconnect the CPT from the contactor coil by controlling the CPT switch to turn off based on the determination of the low-voltage event and to connect the CPT to the contactor coil by controlling the CPT switch to turn on based on a determination that the low-voltage event is over.

Example 8 may include the subject matter of any of examples 1-7, wherein the CPT is configured to charge the RLC circuit.

Example 9 is a method including actuating a contactor coil to connect a power source to a motor; detecting voltage across the contactor coil; determining a presence of a low-voltage event; and connecting a resistor-inductor-capacitor (RLC) circuit to the contactor coil based on the determination of the presence of the low-voltage event; wherein connecting the RLC circuit to the contactor coil causes the RLC circuit to discharge stored electrical energy in the RLC circuit to the contactor coil.

Example 10 may include the subject matter of example 9, wherein connecting the RLC circuit includes activating an RLC circuit switch.

Example 11 may include the subject matter of example 9, wherein the RLC circuit is a first RLC circuit, the method further including after connecting the first RLC circuit to the contactor coil, determining that the low-voltage event is persisting; and connecting a second RLC circuit to the contactor coil to discharge electrical energy stored in the second RLC circuit to the contactor coil.

Example 12 may include the subject matter of example 11, wherein connecting the second RLC circuit includes activating a second RLC circuit switch.

Example 13 may include the subject matter of example 9, wherein determining the presence of a low voltage event includes comparing voltage measured across the contactor coil with a threshold voltage, and determining that the voltage measured across the contactor coil is below the threshold voltage.

Example 14 is a system including a motor including a rotor including three rotor coils; a three-phase power supply; an alternating current (AC) contactor including a contactor coil, the AC contactor configured to selectively connect the three-phase power source to each of the three rotor coils of the motor; a control power transformer (CPT) electrically connected to the contactor coil by a CPT switch; a resistor-inductor-capacitor (RLC) circuit electrically connected to the contactor coil by an RLC circuit switch; a voltage monitor electrically connected to the contactor coil to sense voltage across the contactor coil; and a switch controller to active the RLC circuit switch to selectively connect the RLC circuit to the contactor coil during a low-voltage event determined by the switch controller from voltage across the contactor coil sensed by the voltage monitor.

Example 15 may include the subject matter of example 14, wherein the RLC circuit is a first RLC circuit and the RLC circuit switch is a first RLC circuit switch, the apparatus further including a second RLC circuit electrically connected to the contactor coil by a second RLC circuit switch; and wherein the switch controller is configured to activate the second RLC circuit switch to selectively connect the contactor coil to the second RLC circuit based on a determination of a low-voltage event determined from voltage sensed by the voltage monitor.

Example 16 may include the subject matter of example 14, wherein the switch controller determines the presence of a low-voltage event based on the voltage sensed by the voltage monitor falling below a voltage threshold.

Example 17 may include the subject matter of example 14, wherein the RLC circuit is configured to be an under-damped RLC circuit.

Example 18 may include the subject matter of example 14, wherein the RLC circuit is configured to discharge electrical energy for a predetermined amount of time.

Example 19 may include the subject matter of example 14, wherein the RLC circuit switch includes an insulated-gate bipolar transistor.

Example 20 may include the subject matter of example 14, wherein the switch controller is configured to disconnect the CPT from the contactor coil by controlling the CPT switch to turn off based on the determination of the low-voltage event and to connect the CPT to the contactor coil by controlling the CPT switch to turn on based on a determination that the low-voltage event is over.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. An apparatus comprising:

a resistor-inductor-capacitor (RLC) circuit electrically connected to a contactor coil by an RLC circuit switch;

a voltage monitor electrically connected to the contactor coil to sense voltage across the contactor coil; and a switch controller to activate the RLC circuit switch to selectively connect the RLC circuit to the contactor coil during a low-voltage event determined by the switch controller from voltage across the contactor coil sensed by the voltage monitor, wherein the switch controller determines the presence of a low-voltage event based on the voltage sensed by the voltage monitor falling below a voltage threshold.

2. The apparatus of claim 1, wherein the RLC circuit is a first RLC circuit and the RLC circuit switch is a first RLC circuit switch, the apparatus further comprising:

a second RLC circuit electrically connected to the contactor coil by a second RLC circuit switch; and wherein the switch controller is configured to activate the second RLC circuit switch to selectively connect the contactor coil to the second RLC circuit based on a determination of a low-voltage event determined from voltage sensed by the voltage monitor.

3. The apparatus of claim 1, wherein the RLC circuit is configured to be an under-damped RLC circuit.

4. The apparatus of claim 1, wherein the RLC circuit is configured to discharge electrical energy for a predetermined amount of time.

5. The apparatus of claim 1, wherein the RLC circuit switch comprises an insulated-gate bipolar transistor.

6. The apparatus of claim 1, wherein the switch controller is configured to disconnect the CPT from the contactor coil by controlling the CPT switch to turn off based on the determination of the low-voltage event and to connect the CPT to the contactor coil by controlling the CPT switch to turn on based on a determination that the low-voltage event is over.

7. The apparatus of claim 1, wherein the CPT is configured to charge the RLC circuit.

8. A method comprising:

actuating a contactor coil to connect a power source to a motor;

detecting voltage across the contactor coil;

determining a presence of a low-voltage event; and connecting a resistor-inductor-capacitor (RLC) circuit to the contactor coil based on the determination of the presence of the low-voltage event;

wherein connecting the RLC circuit to the contactor coil causes the RLC circuit to discharge stored electrical energy in the RLC circuit to the contactor coil, wherein determining the presence of a low voltage event comprises comparing voltage measured across the contactor coil with a threshold voltage, and determining that the voltage measured across the contactor coil is below the threshold voltage.

9. The method of claim 8, wherein connecting the RLC circuit comprises activating an RLC circuit switch.

10. The method of claim 8, wherein the RLC circuit is a first RLC circuit, the method further comprising:

after connecting the first RLC circuit to the contactor coil, determining that the low-voltage event is persisting; and connecting a second RLC circuit to the contactor coil to discharge electrical energy stored in the second RLC circuit to the contactor coil.

11. The method of claim 10, wherein connecting the second RLC circuit comprises activating a second RLC circuit switch.

12. A system comprising:

a motor comprising a rotor comprising three rotor coils;

a three-phase power supply;

an alternating current (AC) contactor comprising a contactor coil, the AC contactor configured to selectively connect the three-phase power source to each of the three rotor coils of the motor;

a control power transformer (CPT) electrically connected to the contactor coil by a CPT switch;

a resistor-inductor-capacitor (RLC) circuit electrically connected to the contactor coil by an RLC circuit switch;

a voltage monitor electrically connected to the contactor coil to sense voltage across the contactor coil; and a switch controller to active the RLC circuit switch to selectively connect the RLC circuit to the contactor coil during a low-voltage event determined by the switch controller from voltage across the contactor coil sensed by the voltage monitor, wherein the switch controller determines the presence of a low-voltage event based on the voltage sensed by the voltage monitor falling below a voltage threshold.

13. The system of claim 12, wherein the RLC circuit is a first RLC circuit and the RLC circuit switch is a first RLC circuit switch, the apparatus further comprising:

a second RLC circuit electrically connected to the contactor coil by a second RLC circuit switch; and wherein the switch controller is configured to activate the second RLC circuit switch to selectively connect the contactor coil to the second RLC circuit based on a determination of a low-voltage event determined from voltage sensed by the voltage monitor.

14. The system of claim 12, wherein the RLC circuit is configured to be an under-damped RLC circuit.

15. The system of claim 12, wherein the RLC circuit is configured to discharge electrical energy for a predetermined amount of time.

16. The system of claim 12, wherein the RLC circuit switch comprises an insulated-gate bipolar transistor.

17. The system of claim 12, wherein the switch controller is configured to disconnect the CPT from the contactor coil by controlling the CPT switch to turn off based on the determination of the low-voltage event and to connect the CPT to the contactor coil by controlling the CPT switch to turn on based on a determination that the low-voltage event is over.

* * * * *